United States Patent [19]

Adams et al.

[11] Patent Number: 5,129,148

[45] Date of Patent: Jul. 14, 1992

[54] METHOD FOR MAKING A NON-METALLIC, FIBER REINFORCED ROD END BEARING ASSEMBLY

[75] Inventors: Thomas R. Adams, Huntington Beach; Gary R. Wittman, Costa Mesa, both of Calif.

[73] Assignee: Tiodize Company, Inc., Huntington Beach, Calif.

[21] Appl. No.: 479,555

[22] Filed: Feb. 13, 1990

Related U.S. Application Data

[63] Continuation of Ser. No. 284,318, Dec. 14, 1988, abandoned.

[51] Int. Cl.$^5$ .............................................. F16C 33/00
[52] U.S. Cl. .................... 29/898; 29/898.063; 29/898.066; 29/898.069; 29/898.15
[58] Field of Search ............... 29/898, 898.04, 898.15, 29/434, 525.1, 898.049, 898.05, 898.055, 898.052, 898.063, 898.066, 898.062, 898.069; 74/579 R, 586, 594; 264/137, 257, 258; 384/192, 202, 203, 206, 208, 209; 403/76, 77, 122, 137, 143; 411/397, 400, 908

[56] References Cited

U.S. PATENT DOCUMENTS

| | | | |
|---|---|---|---|
| 2,906,569 | 9/1959 | Runton et al. | 384/206 |
| 3,802,756 | 4/1974 | Turner | 384/206 |
| 4,546,669 | 10/1985 | Fischer et al. | 74/579 E |
| 4,717,302 | 1/1988 | Adams et al. | 411/427 X |

FOREIGN PATENT DOCUMENTS 1084088  6/1960  Fed. Rep. of Germany ...... 411/908

Primary Examiner—Joseph M. Gorski
Attorney, Agent, or Firm—Hawes & Fischer

[57] ABSTRACT

A method for making a non-metallic rod end bearing assembly to be interconnected with a control rod. The assembly comprises a rod end bearing and a hollow collar, such that the rod end bearing can be coupled to one end of the control rod by way of the collar. The rod end bearing and hollow collar are made by first impregnating respective reinforcement of non-metallic fibers with a resin. The resin impregnated fibers are then compression molded into the desired shape. By virtue of the present method, a rod end bearing assembly is available which is characterized by a longer life, greater resistance to corrosion and wear, and a superior weight-to-strength ratio relative to conventional rod end bearing assemblies that are manufactured from metal.

11 Claims, 4 Drawing Sheets

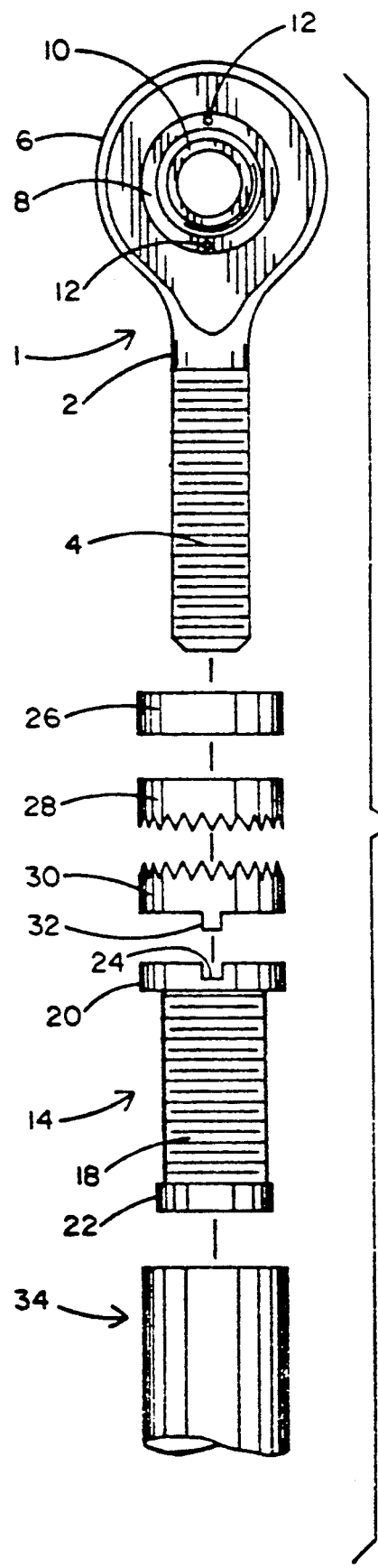
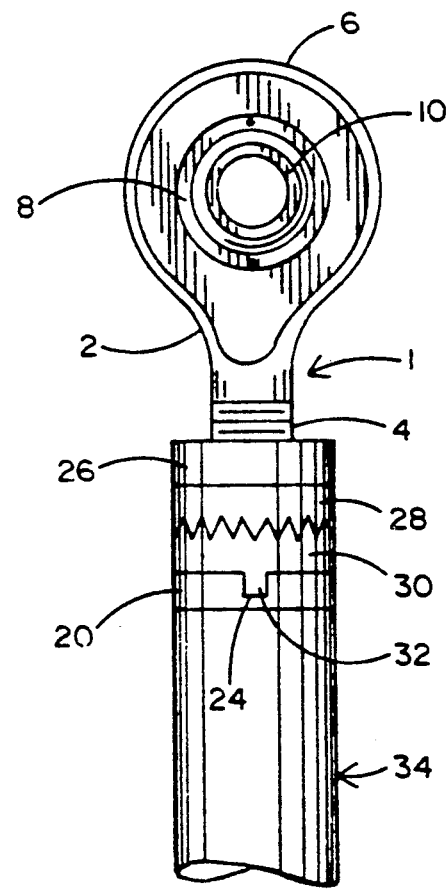
FIG. 1
FIG. 2

METHOD FOR MAKING A NON-METALLIC, FIBER REINFORCED ROD END BEARING ASSEMBLY

This application is a continuation of patent application Ser. No. 284,318 filed Dec. 14, 1988 now abandoned.

BACKGROUND OF THE INVENTION

1. Field of the Invention

This invention relates to a method for making a non-metallic, fiber reinforced rod end bearing assembly having long life, low weight, high strength, and self-lubricating characteristics for reliably coupling a rod end bearing to one end of a hollow control rod for both low and high temperature applications.

2. Background Art

Rod end bearings have long been known to the prior art. However, the conventional rod end bearing is commonly manufactured from metal. Thus, the weight of the rod end bearing is relatively high. Moreover, the metal rod end bearing is susceptible to corrosion and must be lubricated to reduce friction and minimize wear at the interface with a spherical bearing, or the like. What is more, metal rod end bearings are not always suitable for both very high and very low temperature applications, such that said bearings have been known to fail under high loads. Consequently, the life of the conventional rod end bearing may be undesirably shortened.

Examples of known rod end bearings which are formed from metal and permit selective access to a spherical bearing, or the like, for repair or replacement are available by referring to one or more of the following U.S. Pat. Nos.:

| | |
|---|---|
| 2,564,076 | 14 August 1951 |
| 2,766,079 | 9 October 1956 |
| 2,906,568 | 29 September 1959 |
| 4,076,343 | 28 February 1978 |

An example of a rod end bearing which is formed from a molded plastic material is available by referring to U.S. Pat. No. 3,287,071 issued Nov. 22, 1966. However, the referenced rod end bearing is formed by means of an injection molding process (as opposed to a compression molding process) which may undesirably limit the maximum strength thereof.

SUMMARY OF THE INVENTION

In general terms, a method is disclosed for making a non-metallic fiber-reinforced rod end bearing assembly which is to be coupled to a control rod. The rod end bearing assembly of the present invention is characterized by high strength, light weight, long life and corrosion resistance. The assembly comprises a rod end bearing including an axially extended shank, a head coextensively connected to the shank and having a central bore extending therethrough, a monoball located within the central bore, and a race located at the periphery of the central bore for supporting the ball for rotation within the bore. The assembly further comprises a hollow collar to receive the shank therein and to be received within one end of the control rod so that the rod end bearing can be interconnected with the control rod via the collar.

The rod end bearing assembly is made by impregnating respective reinforcements of non-metallic (e.g. graphite, ceramic, carbon or glass) fibers with a (e.g. polyimide or epoxy resin) bonding material and compression molding the resin impregnated fibers for forming the collar and each of the head and shank, ball and race members of the rod end bearing. The non-metallic fibers may be either continuous or chopped; however in the case of the rod and bearing, a continuous fiber configuration is preferred, such that the fibers extend in parallel alignment with one another along the longitudinal axis of the shaft and circumferentially around the head. As an additional preferred embodiment, a lubricant is added to the resin bond material prior to the step of impregnating the fibers from which the race will be compression molded. By virtue of the foregoing, the race of the rod end bearing will be self-lubricating to minimize wear and avoid the necessity of adding a lubricant during use. The race may be formed as a pair of ring-like bushings which are arranged in face-to-face alignment with one another within the central bore of the head for receiving and supporting the ball. One or the other of the bushings may be selectively removed from the central bore to permit access to the ball for repair and/or replacement. Threads may be formed in or around the shank of the rod end bearing and the hollow collar during the compression molding step or by grinding or drill and tapping after the molding step has been completed.

BRIEF DESCRIPTION OF THE DRAWINGS

FIG. 1 is an exploded view of the non-metallic, fiber-reinforced rod and bearing assembly which forms the present invention.

FIG. 2 shows the rod end bearing assembly of FIG. 1 in the assembled relationship coupled to a control rod;

DESCRIPTION OF THE PREFERRED EMBODIMENT

Figure 3:
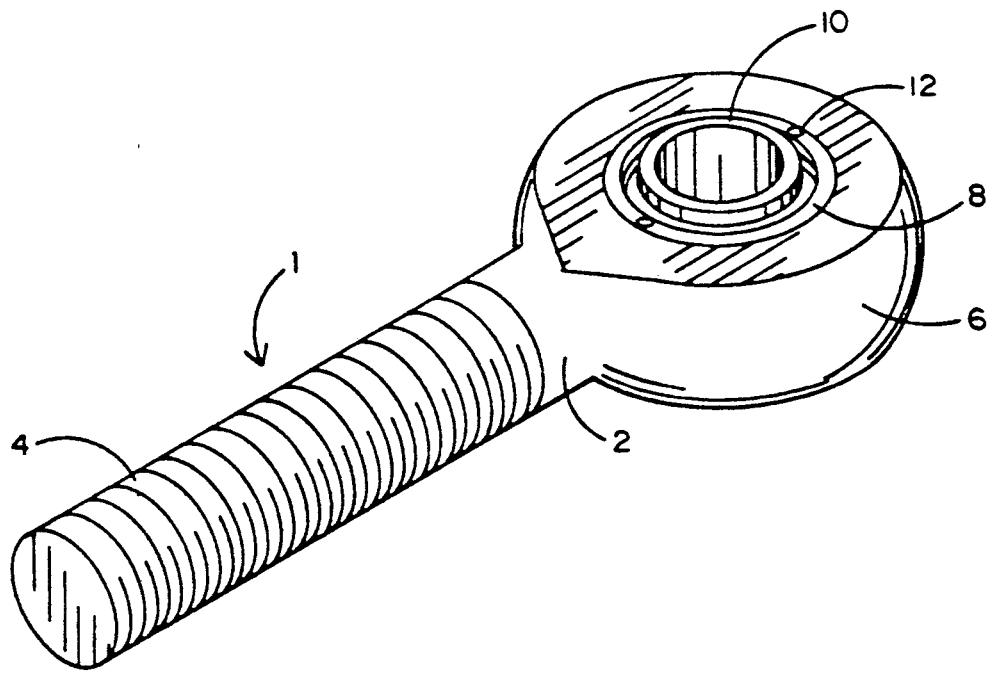
FIG. 3 is an isometric view of the rod end bearing which forms the assembly of FIG. 1.
Figure 6:
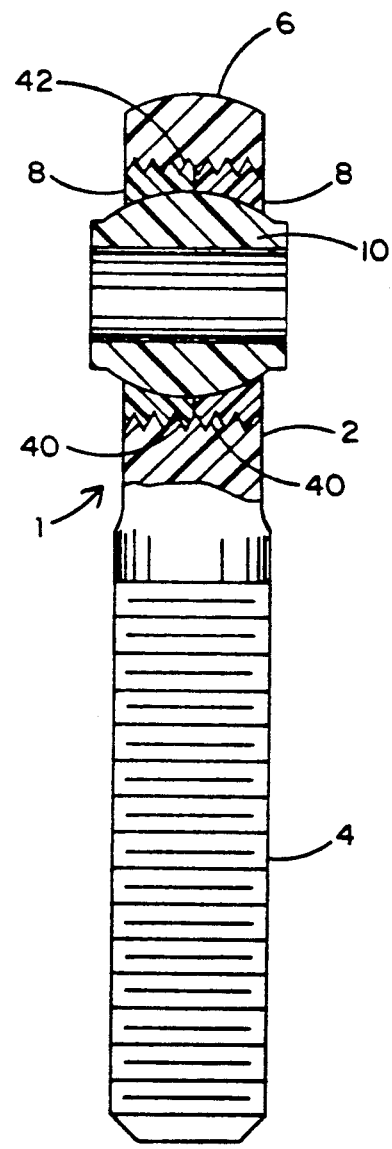
FIG. 6 is a partial cross-section of the rod end bearing of FIG. 3.

The non-metallic rod end bearing assembly which forms the present invention is now described in detail while referring to the drawings where FIG. 1 shows an exploded view of the assembly, and FIG. 2 shows the assembled relationship coupled to a conventional control rod 34. Referring concurrently to FIGS. 1-3, the rod end bearing assembly includes a rod end bearing 1 which, as will be described in greater detail hereinafter when referring to FIG. 6, is compression molded from non-metallic resin impregnated fibers. Rod end bearing 1 has a housing 2 comprising a longitudinally extending, screw threaded shank 4 and a coextensively connected, generally round head 6 having a central bore extending therethrough. However, it is to be understood that the rounded head 6 of rod end bearing 1 is for purposes of example only, and said head may have any other (e.g. elongated) configuration which is suitable for a given application.

Located in face-to-face alignment with one another within the bore of head 4 are a pair of ring-like bushings or races 8 (only one of said races being visible in FIGS. 1-3). As is best illustrated in FIG. 6, either one of the races 8 is selectively rotatable in the central bore to be removable from the rod end bearing 1 to thereby permit access to a monoball 10 which is seated upon and supported for rotation by the races 8. To this end, each race 8 is provided with a pair of eyelets 12 formed in the face thereof whereby to permit engagement by a suitable tool (not shown) for the purpose of rotating and thereby removing said race to permit access to the ball 10 for removal, repair and/or replacement. By way of example, the ball 10 that is seated upon and supported by the races 8 within the central bore may form a spherical bearing (as shown), a ball bearing, and journal bearing or the like.

Figure 4:
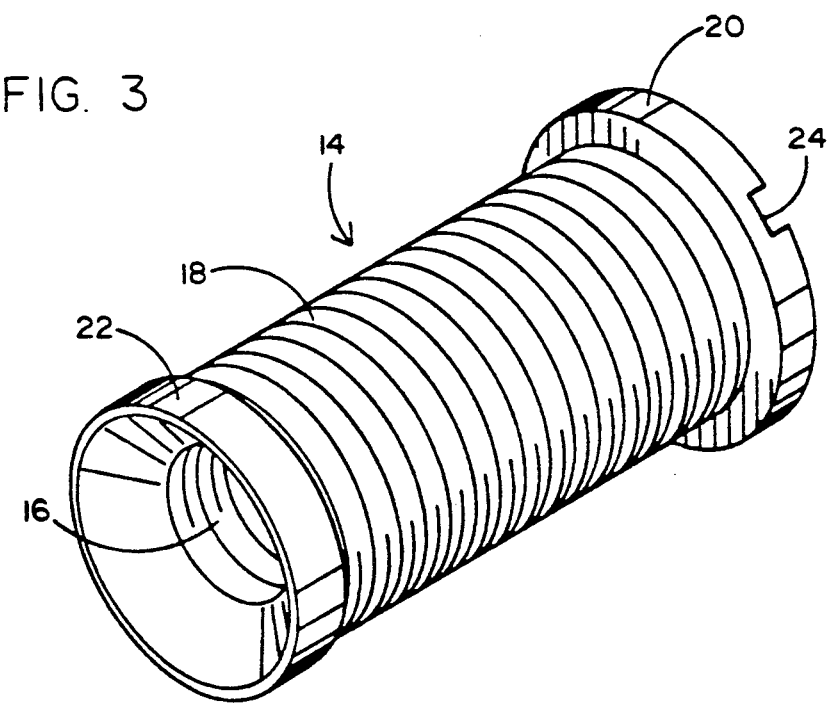
FIG. 4 is an isometric view of the collar which also forms the assembly of FIG. 1.

Referring concurrently to FIGS. 1, 2 and 4 of the drawings, the rod end bearing 1 is shown adapted to be mated to a hollow, generally cylindrical collar or insert 4. As will be described in greater detail hereinafter when referring to FIG. 7, collar 14 is compression molded from non-metallic resin impregnated fibers. The hollow collar 14 includes an internally threaded surface 16 for connection to the threaded shank 4 of rod end bearing 1 and an externally threaded surface 18 for connection to one end of a hollow control rod 34. That is, the external surface 18 of collar 14 may be screw threaded (as shown), knurled, ridged, or provided with similar mechanical locking means to be securely connected within a hollow end of the control rod 34. Collar 14 also includes an integral flange 28 extending around one end thereof and an integral lip 22 extending around the opposite end. A recess 24 extends across flange 20 for a purpose which will soon become apparent.

As previously indicated, the threaded shank 4 of rod end bearing 1 is adapted to be received in and mated to the threaded inner surface 16 of collar 14. In order to prevent a rotation of collar 14 (and the control rod 34) relative to rod end bearing 1, a series of threaded, metallic or non-metallic washers 26, 28 and 30 are preferably located between shank 4 and collar 14. More particularly, a top-most washer 26 is screwed onto shank 4 to apply a tightening pressure to a pair of lock washers 28 and 30 to be located therebelow. Washers 28 and 30, which have respective complementary saw tooth surfaces are screwed onto shank 4 below washer 26 such that, in the assembled relationship of FIG. 2, said saw tooth surfaces are arranged in mating engagement with one another. The bottom-most washer 30 has a tongue 32 projecting downwardly therefrom such that, in the assembled relationship of FIG. 2, the tongue 32 will be received within the recess 24. Accordingly, a rotation of the control rod 34 will be reliably transferred to the rod and bearing 1 by way of the threaded collar 14, the receipt of tongue 32 within recess 24, the mating together of the opposing teeth of washers 28 and 30, and the threaded shank 4.

The hollow control rod 34 may be attached to the external locking means (e.g. screw threads 18) of collar 14 by way of a conventional filament winding operation. In general terms, carbon or glass filaments, or the like, are wound around the collar 14 and a removable mandrel which supports the collar. When a suitable filiment rod 34 is built up around the outsides of the mandrel and collar, the mandrel is removed, leaving a hollow control rod surrounding the collar 14 and secured to the external screw threads 18 thereof.

A similar collar 14 can be secured within the opposite end of control rod 34 (not shown) so that each end of the control rod will be interconnected with a respective rod end bearing 1. The assembled relationship of control rod 34 and oppositely projecting rod end bearings 1 have a variety of useful applications including, but not limited to, throttle control for a motor vehicle and wing flap or tail rudder control for an aircraft.

Figure 5:
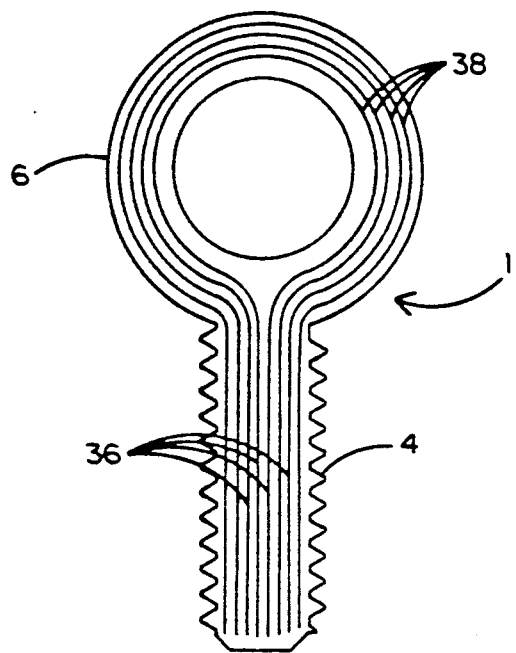
FIG. 5 is illustrative of the continuous fiber orientation for making the rod end bearing of FIG. 3.
Figure 7:
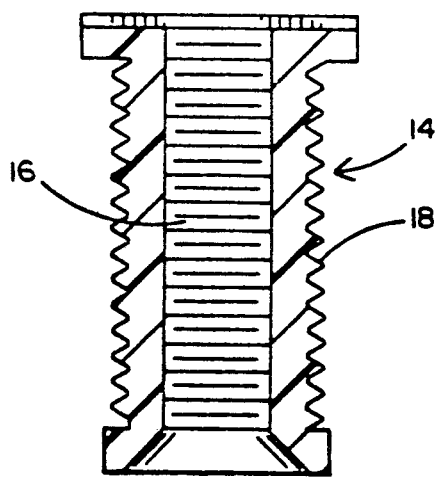
FIG. 7 is a cross-section of the collar of FIG. 4.

The method for making the rod end bearing assembly of FIGS. 1-4 is now described while referring to FIGS. 5-7 of the drawings. Referring initially to FIGS. 5 and 6, the housing 2 of rod end bearing 1 is formed from non-metallic (e.g. glass or carbon) fibers which are impregnated with a resin. The non-metallic fibers are initially arranged in flat sheets, such as that available from Fiberite Corporation. The fibers are preferably continuous, but may be long chopped, as well. In the event that the rod end bearing 1 will be subjected to moderate to very low temperatures, the fibers are preferably impregnated with an epoxy resin. In the event that the rod end bearing will be subjected to high temperatures, then a polyimide resin is suitable for bonding the fibers.

A mold is made in which to shape the rod end bearing 1, and the reinforcement of resin impregnated fibers are laid therein. The fibers are arranged in the mold to achieve a particular fiber orientation. That is to say, and as is best shown in FIG. 5, it is desirable that the continuous fibers 36 or a large percentage of the long chopped fibers in the shank 4 extend in parallel alignment with one another along the longitudinal axis of the shank and that the fibers 38 which form the head 6 extend circumferentially in the hoop direction, such that a high strength fiber/matrix construction will be produced. The fiber reinforcement is then subjected to a compression molding step, whereby to form the housing 2. The compression molding step heat cures and cross links the resin so as to provide the finished rod end bearing 1 with a high strength characteristic. External threads may be ground into the shank 4 after the compression molding step, or the threads may be formed in the shank 4 during molding. By way of example only, the fiber reinforcement is subjected to pressures of 1000-2000 psi and temperatures of 300-350 degrees F. during the compression molding step, although the actual pressures and temperatures will depend upon the types of fiber and resin employed.

It has been found that by forming the housing 2 of rod end bearing 1 as described above, the rod end bearing can be adapted for use in high temperature environments (e.g. up to approximately 600 degrees F. during continuous operation and approximately 650 degrees F. during intermittent operation) or moderate to low temperature environments (up to approximately 300 degrees F. during continuous operation and approximately 400 degrees F. during intermittent operation or down to approximately −320 degrees F. with a 22,000 psi tensile load). This lower range of use is believed to be particularly significant, because conventional threaded rod end bearings that are made from metal will usually not survive extremely low temperatures under high tensile loads, such as that which may be experienced by certain high altitude aircraft or space vehicles.

Moreover, by compression molding the housing 2, a rod end bearing of greater strength is available than would be available if an injection molding step were otherwise employed. What is more, a rod end bearing of maximum strength and reliability may be achieved by forming housing 2 with the particular continuous fiber or long chopped fiber orientation as shown in FIG. 5, as opposed to a low density, short milled matrix of randomly oriented fibers.

The formation of the races 8 of rod end bearing 1 is now described. The races 8 are formed from non-metallic (e.g. graphite or ceramic) fibers that are impregnated with a (e.g. polyimide) resin. The fibers used to form the races 8 may be either long chopped or continuous. As an important step in the formation of the races 8, a lubricating pigment (e.g. molybdenum disulphide) is mixed with the resin prior to bonding the non-metallic fibers. The lubricant provides the races with a self-lubricating characteristic which is particularly advantageous in minimizing friction and reducing wear at the interface between the monoball 10 and the races 8. However, the amount and selection of the actual lubricant to be mixed with the resin is dependent upon the desired coefficient of friction and temperature range requirements. The resin impregnated fibers are then compression molded to form the desired ring-like shape of the races 8. Threads are formed in the races during the molding step or by grinding after the molding has been completed.

As is best shown in FIG. 6, each of the races 8 is compression molded to form a ring-like bushing having a smooth, low friction surface at which to engage and support the monoball 10 for rotation. The opposite surface 40 of each race 8 is molded or ground so as to have screw threads which permit either one of the races to be selectively removed from the central bore of the head 6 of rod end bearing 1. That is to say, extending circumferentially along the head 6 of rod end bearing 1 around the central bore thereof is a screw threaded surface 42. The respective screw threated surfaces 40 and 42 of races 8 and head 6 permit the races to be either mated to the head 6 to support ball 10 or removed from the head so as to permit access to ball 10 for repair and/or replacement. The foregoing may be accomplished by means of a tool and the eyelets (designated 12 in FIGS. 1-3) into which said tool is to be inserted.

The monoball 10 of FIG. 6 may also be manufactured from a non-metallic material. More particularly, ball 10 may be compression molded from the same resin impregnated fibers (e.g. containing either chopped or continuous graphite or ceramic fibers impregnated with a polyimide resin) from which the races 8 are to be manufactured. However, the lubricating pigment added to the resin of races 8 is omitted from the resin of ball 10. However, and as an alternative embodiment, the lubricating pigment may otherwise be added to the resin of ball 10 and omitted from that of the races 8.

To complete the non-metallic rod and bearing assembly of the present invention, and referring to FIG. 7 of the drawings, the method for making the collar or insert 14 is now disclosed. More particularly, the collar 14 is formed from non-metallic (e.g. carbon, glass or ceramic) fibers which are impregnated with either a thermoplastic or thermosetting (e.g. polyimide or phenolic) resin. The fibers may be aligned either in a continuous or randomly chopped orientation. The resin impregnated fibers are compression molded within a mold having the shape of the intended collar 14. The interior and exterior threads 16 and 18 of collar 14 may be formed during compression molding or ground after the molding step has been completed.

By virtue of the present invention, a non-metallic rod end bearing assembly (e.g. as shown in FIGS. 1 and 2) is available which has significant advantage over conventional rod end bearing assemblies that are manufactured from metal (e.g. such as stainless steel or titanium). For example, the non-metallic rod end bearing assembly formed by the presently disclosed method will have a superior weight-to-strength ratio relative to a conventional metal assembly. That is, the rod end bearing 1 has a fraction of the weight of a conventional metal rod end bearing while being capable of withstanding high shear loads. The non-metallic assembly will be non-corrosive and, because of the self-lubricating nature of the races 8 or ball 10, will have a relatively low coefficient of friction at the ball/race interface. Thus, the rod end bearing 1 will typically experience less wear and possess a longer life than a corresponding metallic rod end bearing. Moreover, the self-lubricating characteristic of the rod end bearing 1 avoids the necessity of using oil and/or grease as a commonly required lubricating agent for a metallic rod end bearing of the prior art.

Figure 8:
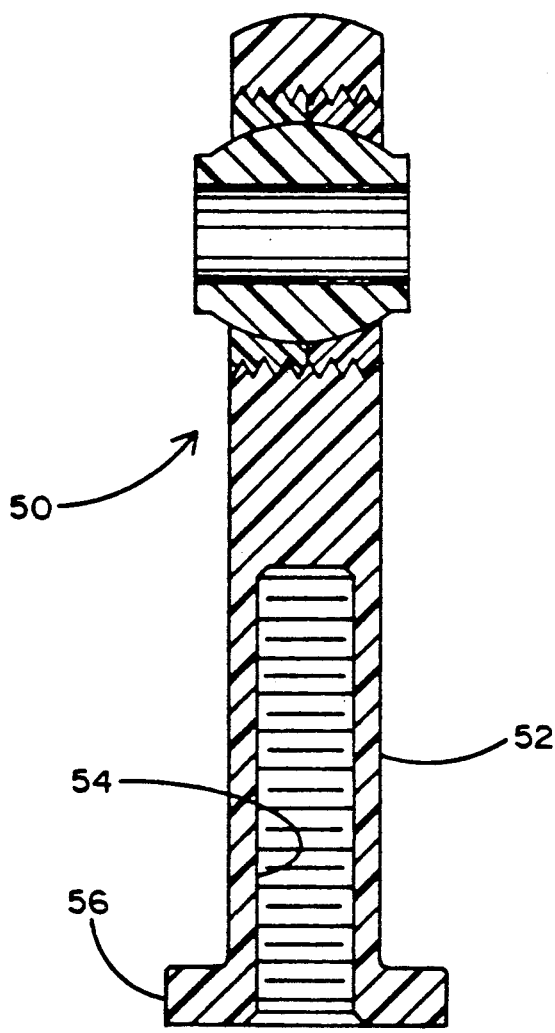
FIG. 8 is a partial cross-section of a rod end bearing which forms an alternate embodiment of the invention.

FIG. 8 of the drawings illustrates an alternate embodiment for the rod end bearing 1 which was described while referring to FIGS. 1-7. More particularly, a non-metallic rod end bearing 50, having a hollow, internally threaded shank 52, may be formed from a compression molded, resin impregnated fiber reinforcement. The hollow interior of shank 52 may be established by a conventional drill and tapping process. Accordingly, the rod end bearing 50 may be interconnected with the previously described collar 14 (of FIGS. 1-7) by means of a cylindrical adapter (not shown) having screw threads formed at opposite ends thereof. That is, one screw threaded end of the connecting adapter is received within and mated to the hollow interior of shank 52 at corresponding screw threads 54 thereof. The opposite screw threaded end of the connecting adapter is received within and mated to the hollow interior of insert 14 at the corresponding screw threads 16 thereof. A hexagonal flange 56 is shown extending around the periphery of the shank 52 to facilitate the attachment of the rod end bearing 50 to the collar 14 via the connecting adapter.

It will be apparent that while a preferred embodiment of the invention has been shown and described, various modifications and changes may be made without departing from the true spirit and scope of the invention. By way of example, although the fiber orientation for making the rod end bearing assembly has been described as being either continuous or chopped, it may also be desirable to utilize a three dimensional fiber orientation, such as that disclosed in U.S. Pat. Nos. 4,717,302 and 4,778,637 which are assigned to the assignee of the present invention.

Having thus set forth a preferred embodiment of the invention, what is claimed is:

1. A method for making a non-metallic rod end bearing assembly including a non-metallic rod end bearing to be interconnected with a control rod, said method including making said rod end bearing by the steps comprising:

compression molding a first plurality of non metallic, resin impregnated fibers to form a non-metallic housing having a head with a central bore therethrough and an elongated shank coextensively connected to and projecting from said head to be interconnected with the control rod such that said fibers extend continuously and in parallel alignment along said shank and around said head, and forming a series of threads extending around said shank;

molding a second plurality of non-metallic, resin impregnated fibers to form a non-metallic ball and supporting said ball for rotation within the central bore of the head of said housing;

molding a third plurality of non-metallic, resin impregnated fibers to form a non-metallic race and removably locating said race within said central bore for receiving and supporting said ball for rotational movement; and forming means on said race to permit said race to be engaged and removed from said central bore to permit access to and removal of said ball.

2. The method recited in claim 1, including the additional step of establishing a hollow longitudinally extending passage through the shank of said housing and forming said threads to extend around said passage at the interior of said shank.

3. The method recited in claim 1, including the additional step of molding a hollow, non-metallic collar having a series of threads extending therearound, and connecting a first end of said collar to the control rod and the opposite end of said collar to the threaded shank of the housing of said rod end bearing.

4. The method recited in claim 1, including the additional step of impregnating said third plurality of non-metallic fibers with a resin that has been mixed with a lubricant prior to the step of molding said fibers to form said non-metallic race.

5. The method recited in claim 1, including the additional step of forming at least some of said first, second and third pluralities of non-metallic fibers from glass.

6. The method recited in claim 1, including the additional step of forming at least some of said first, second and third pluralities of non-metallic fibers from carbon.

7. The method recited in claim 1, including the additional step of forming at least some of said first, second and third pluralities of non-metallic fibers from graphite.

8. The method recited in claim 1, including the additional step of forming at least some of said first, second and third pluralities of non-metallic fibers from a ceramic.

9. The method recited in claim 1, including the additional step of impregnating at least some of said first, second and third pluralities of non-metallic fibers with an epoxy resin.

10. The method recited in claim 1, including the additional step of impregnating at least some of said first, second and third pluralities of non-metallic fibers with a polymide resin.

11. The method recited in claim 1, including the additional step of grinding screw threads into the shank of said rod end bearing after the step of molding said first plurality of non-metallic fibers.

* * * * *